(12) United States Patent
McGee et al.

(10) Patent No.: US 9,194,628 B2
(45) Date of Patent: Nov. 24, 2015

(54) CARBON BAKING OXYGEN PREHEAT AND HEAT RECOVERY FIRING SYSTEM

(71) Applicants: Mike McGee, Greer, SC (US); Tom Haines, Evansville, IN (US); Kenneth Meyer, Mt. Pleasant, SC (US); Steve Hilock, Greenville, SC (US)

(72) Inventors: Mike McGee, Greer, SC (US); Tom Haines, Evansville, IN (US); Kenneth Meyer, Mt. Pleasant, SC (US); Steve Hilock, Greenville, SC (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 331 days.

(21) Appl. No.: 13/794,502

(22) Filed: Mar. 11, 2013

(65) Prior Publication Data

US 2013/0337392 A1 Dec. 19, 2013

Related U.S. Application Data

(60) Provisional application No. 61/660,465, filed on Jun. 15, 2012.

(51) Int. Cl.
| | |
|---|---|
| *C10B 29/02* | (2006.01) |
| *F27B 13/06* | (2006.01) |
| *F27B 13/14* | (2006.01) |
| *F27D 17/00* | (2006.01) |

(52) U.S. Cl.
CPC .............. *F27B 13/14* (2013.01); *F27D 17/00* (2013.01)

(58) Field of Classification Search
CPC ........ F27B 13/06; F27B 17/005; F27B 13/02; C04B 35/532; C10B 29/02
USPC ............... 432/192, 152, 176, 199, 173
See application file for complete search history.

(56) References Cited

U.S. PATENT DOCUMENTS

| | | | | |
|---|---|---|---|---|
| 1,330,175 | A * | 2/1920 | Doerschuk | 432/169 |
| 3,048,382 | A * | 8/1962 | Mansfield | 432/3 |
| 4,202,661 | A * | 5/1980 | Lazaridis et al. | 432/8 |
| 4,215,982 | A * | 8/1980 | Genevois et al. | 432/192 |
| 4,253,823 | A | 3/1981 | Holdner | |
| 5,473,628 | A | 12/1995 | Tokvam et al. | |
| 5,759,027 | A * | 6/1998 | Werge-Olsen et al. | 432/192 |
| 5,779,970 | A * | 7/1998 | Charmier et al. | 266/44 |
| 6,436,335 | B1 | 8/2002 | Leisenberg | |
| 8,651,856 | B2 * | 2/2014 | Leisenberg | 432/192 |

FOREIGN PATENT DOCUMENTS

| | | |
|---|---|---|
| EP | 0541165 | 11/1992 |
| GB | 116455 | 6/1918 |
| GB | 948038 | 1/1964 |
| WO | 91/19147 | 12/1991 |
| WO | 2004/027332 | 4/2004 |

* cited by examiner

*Primary Examiner* — Gregory A Wilson
(74) *Attorney, Agent, or Firm* — Fish & Tsang LLP

(57) ABSTRACT

Contemplated devices and methods reduce heat loss and energy demand in a ring furnace by heating an additional oxygen containing stream in a supplemental oxygen conduit that is thermally coupled to a flue duct of a cooling zone. The so heated additional oxygen containing stream is then fed to the firing and/or pre-heat zones to increases combustion of volatiles and to reduce fuel demand by recycling waste heat to the firing and/or pre-heat zones.

18 Claims, 3 Drawing Sheets

CARBON BAKING OXYGEN PREHEAT AND HEAT RECOVERY FIRING SYSTEM

This application claims the benefit of priority to U.S. provisional application having Ser. No. 61/660,465, filed on Jun. 15, 2012.

FIELD OF THE INVENTION

The field of the invention is devices and methods for increasing thermal efficiency in furnaces, and especially in ring furnaces for carbon baking operations.

BACKGROUND

Carbon baking furnaces, and particularly ring furnaces, are often used in the manufacture of carbon anodes for the aluminum smelting processes. Due to the high temperatures and long baking times, anode baking requires substantial quantities of energy and has become a significant contributor to production cost. Moreover, due to the often relatively low oxygen content in the furnace, pitch is not completely combusted and tends to lead to fires, variations in operating conditions, and maintenance issues for downstream scrubber systems.

Numerous ring furnaces for carbon baking and methods of operating same are known in the art, and exemplary devices and methods are described, for example, in WO 02/099350, U.S. Pat. Nos. 4,215,982, 4,284,404, and 6,339,729, GB 116455, EP 0 541 165, and WO9855426A1. Computer-control of firing rates for burners is disclosed in U.S. Pat. No. 6,436,335, and U.S. Pat. No. 4,253,823 teaches use of a water spray/vapor to increase heat transfer between the cooling gas and baked carbon electrodes. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

While most of these known furnaces are satisfactory for a particular operation, they often tend to limit their use to baking of materials within relatively small dimensional variation. To overcome such disadvantage, GB 948,038 teaches a baking furnace with a refractory floor and vertical metal flues to so adapt to baking of carbonaceous bodies of widely different sizes and shapes under conditions of increased thermal efficiency, increased unit capacity, and reduced furnace construction and operational costs. Among other configurations, the furnace of the '038 reference is configured to allow feeding of the exhaust gas after leaving the furnace back to the combustion source. However, such feedback is typically not suitable for a ring furnace.

In yet another known attempt to improve energy efficiency, EP 0 158 387 teaches heating of carbon materials in a first pre-heating stage up by use of hot combusted volatile matter, which is obtained by withdrawing the released volatile matter from the first stage, burning the volatile matter outside the first stage, and by recycling the burnt volatile matter to the first stage. Such configuration advantageously improves the pre-heating. Nevertheless, considerable amounts of energy are still required for the firing zone of the furnace.

In still other known methods, attempts have been undertaken to introduce supplementary air to the preheating zone of a ring furnace to so reduce incomplete combustion of pitch and other undesirable side products as, for example, described in WO 91/19147. Such approach may conceptually be attractive, however, suffers from various drawbacks in practice. For example, where the supplemental air enters the flue in the preheating zone by way of a valve using the negative pressure in the preheating zone flue, the zero point may move in the furnace towards the firing zone. To help overcome this disadvantage, the draft rate at the preheating zone may be increased. However, such increase may adversely affect the temperature gradient in the preheating zone and may not yield desirable heating performance. Still further, the energy gain by introduction of supplemental air for increased combustion will be in most cases neutralized by a temperature drop caused by the addition of supplemental air. Similarly, WO 2004/027332 describes near real-time measurement of soot in the furnace and adjusts the fuel feed rate, draft fan rate, and/or secondary air feed through openings in the zones of the furnace in response to the measured soot level. Notably, the '332 application appears to recognize the drawbacks of secondary air feed and teaches that secondary air feeds are undesirable and that proper furnace design should eliminate the need for secondary air feeds.

Thus, even though numerous configurations and methods for carbon baking furnaces are known in the art, there is still a need for more energy efficient furnaces.

SUMMARY OF THE INVENTION

The inventive subject matter is drawn to various devices and methods of recovery of waste heat and reducing energy consumption in a furnace, and most typically in a ring furnace, in which a supplemental oxygen conduit is provided that allows feeding of heated additional oxygen to the firing and/or pre-heat zones to not only assist in complete combustion of the fuel and/or volatiles, but also act as a heat transfer medium for waste heat in the cooling zone. Consequently, waste heat is recovered and thus reduces fuel demand, while at the same time oxygen content is increased, which allows for complete combustion of the volatiles at reduced fuel input.

In one aspect of the inventive subject matter, an oxygen preheat and heat recovery system for use in a carbon baking furnace is contemplated that includes a plurality of wall elements (also known as sections), each having multiple internal flue channels, wherein the plurality of wall elements are fluidly coupled to each other such that the internal flue channels form a continuous flow path having, in sequence, a pre-heat zone, a firing zone, and a cooling zone. A supplemental oxygen conduit is present in contemplated systems that is thermally coupled to at least part of the flue channel of the cooling zone such that supplemental oxygen flowing in the supplemental oxygen conduit is isolated from but heated by a cooling air stream flowing through the cooling zone. In especially preferred systems, the supplemental oxygen conduit has a delivery opening that delivers the supplemental oxygen stream directly (preferably not through one or more burners or fuel inlets) to the internal flue channel of the firing zone and/or the pre-heat zone.

While in certain aspects of the inventive subject matter the supplemental oxygen conduit is formed (e.g., as a channel) within a wall section of the plurality of wall elements, the supplemental oxygen conduit may also be a separate conduit that is at least partially disposed within the flue channels of the cooling zone. Regardless of the nature of the conduit, it is typically preferred that one or more gates are coupled to the supplemental oxygen conduit and configured to direct flow of the supplemental oxygen stream into a desired wall element of the firing zone and/or pre-heat zone. To automate operation, a control system may be included that operate the gates such that the flow to desired wall element is maintained at desired values.

In further contemplated aspects of the inventive subject matter, the delivery opening is configured to deliver the supplemental oxygen stream to a position downstream of a first firing frame in the firing zone, or to a position at or downstream of a terminal firing frame in the firing zone, or to deliver the supplemental oxygen stream to the internal flue channel of the pre-heat zone. Moreover, it is typically preferred that the supplemental oxygen conduit is configured (or is coupled to a control device) to allow delivery of the supplemental oxygen stream at about an operating pressure present in the firing zone and/or the pre-heat zone. The term "about" in conjunction with a numerical value or parameter as used herein refers to a range of +/−10%, inclusive, of the numerical or parameter. For example, if the operating pressure in the preheat zone is about 80 kPa, the term about 80 kPa refers to a range of 72-88 kPa.

Viewed form a different perspective, the inventors also contemplate a method for reducing energy consumption of a furnace with a plurality of wall elements (each having an internal flue channel, wherein the wall elements are fluidly coupled to each other such that the internal flue channels form a continuous flow path to form, in sequence, a pre-heat zone, a firing zone, and a cooling zone in which a plurality of gates are operated to configure a supplemental oxygen conduit such that at least a portion of the supplemental oxygen conduit is thermally coupled to at least a portion of the internal flue channel of the cooling zone. In another step, a supplemental oxygen stream is heated in the supplemental oxygen conduit using heat from a cooling air stream flowing through the internal flue channel of the cooling zone, and in yet another step, at least a portion of the heated supplemental oxygen stream is directly delivered (preferably not through one or more burners or fuel inlets) to the internal flue channel of the firing zone and/or the pre-heat zone.

In particularly preferred methods, the gates are coupled to the wall elements, and the supplemental oxygen conduit is formed within a wall section of the plurality of wall elements. Most typically, the supplemental oxygen stream is heated to a temperature of at least 1000° C., (which may or may not be performed with a heat exchange medium, or by radiant heat transfer from the cooling air stream flowing through the internal flue channel to the supplemental oxygen stream). In some aspects of the inventive subject matter, it is preferred that the supplemental oxygen stream is delivered to a position at or downstream of a terminal firing frame in the firing zone, and that the heated supplemental oxygen stream is delivered at a greater pressure than an operating pressure present in the firing zone and/or the pre-heat zone.

Therefore, the inventors also contemplate a method of reducing energy consumption of a ring furnace having a preheat zone, a firing zone, and a cooling zone, in which heat energy is recycled from the cooling zone to the pre-heat zone and/or firing zone, and in which the heat energy is carried from the cooling zone to the pre-heat zone and/or firing zone by a supplemental oxygen stream.

In such methods, the step of recycling is performed using a configurable conduit that is formed in or runs though a plurality of wall elements that make up the pre-heat zone, the firing zone, and the cooling zone. It is also generally preferred that the supplemental oxygen stream is delivered at about an operating pressure present in the firing zone and/or pre-heat zone. While not limiting to the inventive subject matter, the supplemental oxygen stream may have an oxygen concentration that is greater than 21%.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

Prior art

Prior art

DETAILED DESCRIPTION

The inventors have discovered that a carbon baking ring furnace can be equipped with a supplemental oxygen conduit that is configured to also allow recycling of waste heat from the cooling zone to the firing and/or preheat zone system to so significantly reduce fuel (e.g., natural gas), in many cases up to 25% to 40% reduction, while at the same time allowing for complete combustion of volatiles and pitch. Most notably, contemplated systems and methods unify two distinct parameters that would otherwise be irreconcilable: reduction in fuel consumption and increase in combustion of volatiles and pitch. In addition, the inventors discovered that use of a supplemental oxygen conduit as provided herein advantageously allows for draft reduction in the furnace, which in turn reduces energy and maintenance demand for the draft fans, as well as reduces energy requirements for downstream scrubbers (where installed).

Of course, it should be appreciated that the zones as referred to herein are no positionally fixed zones, but (typically identically configured) zones that are operated as preheating, firing, and cooling zones as a function of the position of the cooling manifold, firing frame, and exhaust manifold. Moreover, it should be noted that each of the pre-heating, firing, and cooling zones will have a plurality of sections. Thus, in most typical embodiments, each zone and/or section will comprise a plurality of wall elements, each having an internal flue channel, wherein the plurality of wall elements are fluidly coupled to each other such that the internal flue channels form a continuous flow path to form, in sequence, the pre-heat zone, the firing zone, and the cooling zone. A firing unit is then operationally coupled to at least one wall element (of a single section or zone) and configured to provide fuel natural gas, syngas, or other hydrocarbon fuel) to the firing zone, while the cooling and exhaust manifolds are positioned appropriately upstream and downstream of the firing unit.

Figure 1:
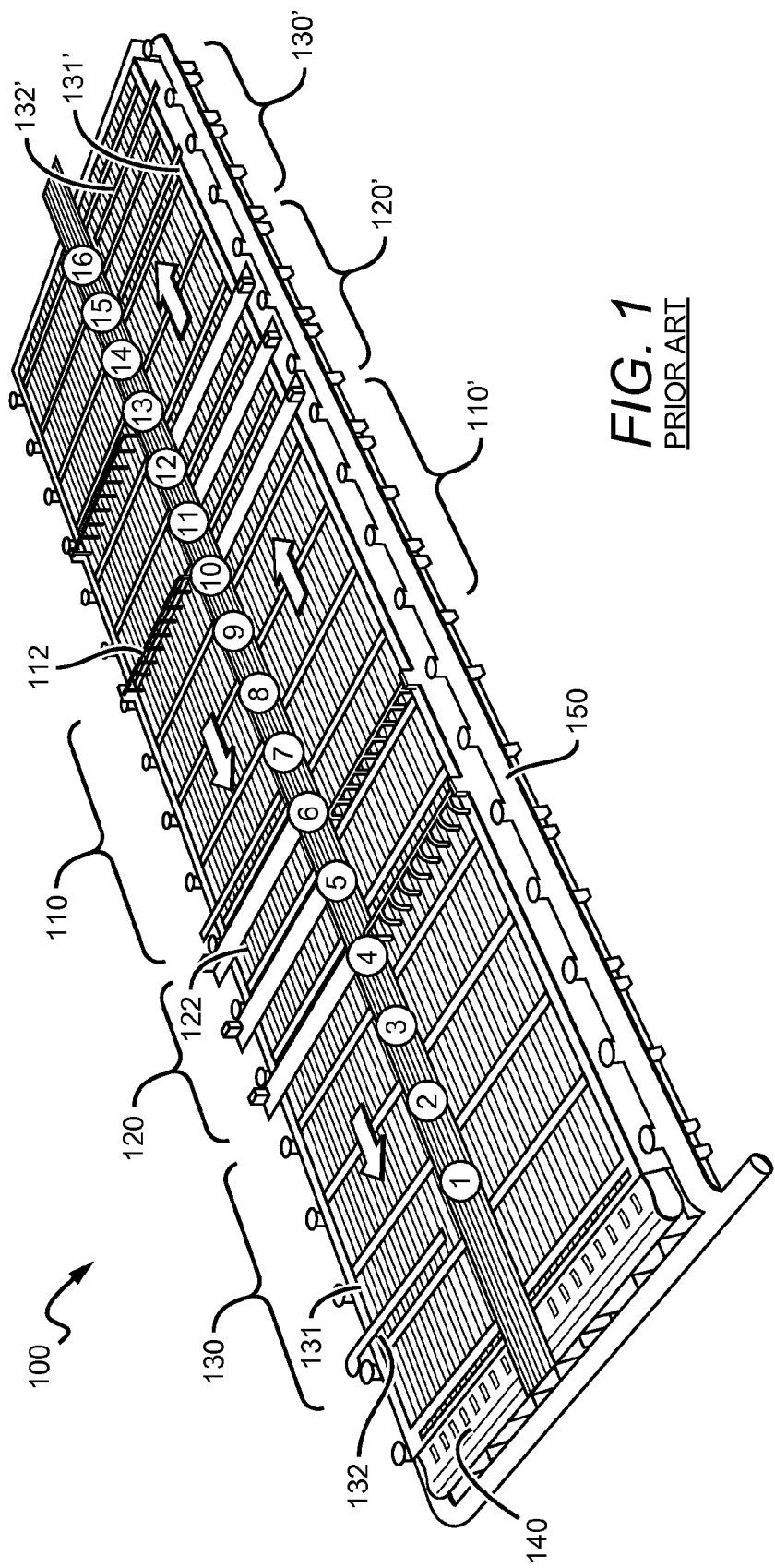
FIG. 1 is a schematic of an exemplary ring furnace for baking carbon anodes.

Prior art FIG. 1 schematically illustrates an exemplary ring furnace 100 having two parallel trains of sections (e.g., 1-16) that are fluidly coupled by a crossover to form a ring furnace (it should be noted that the preheat, firing, and cooling zones rotate around the furnace). As the firing zone advances, anodes are removed and added in sections in advance of the firing zone to so allow continuous operation of the furnace runs. In the bake furnace 100 of Prior Art FIG. 1, there are two firing zones 120 moving in counter clockwise direction with each advance. An advance increments the process one section at a time around the furnace. The firing frame 122 (only one labeled), preheat zones 130, cooling zones 110, preheat (exhaust) manifold 132, and cooling manifold 112 advance around the ring furnace with the firing zones. Stationary parts of the furnace are the crossover 140 and common collection side exhaust main 150 as well as the sections, flues, and walls. Each train has a pre-heating zone 130 and 130' with a firing zone 120 and 120', one or more firing frames 122 (only one is labeled), draft frames 131 and 131', and cooling zone 110 and 110', respectively. Crossover 140 connects the trains, and exhaust gas from the preheat (exhaust) manifolds 132 and 132' is delivered to common exhaust collection conduit 150. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Of course, it should be recognized that the particular number of wall elements in the preheat, firing, and cooling zones can vary considerably and will generally depend on furnace design and operation.

Figure 2:
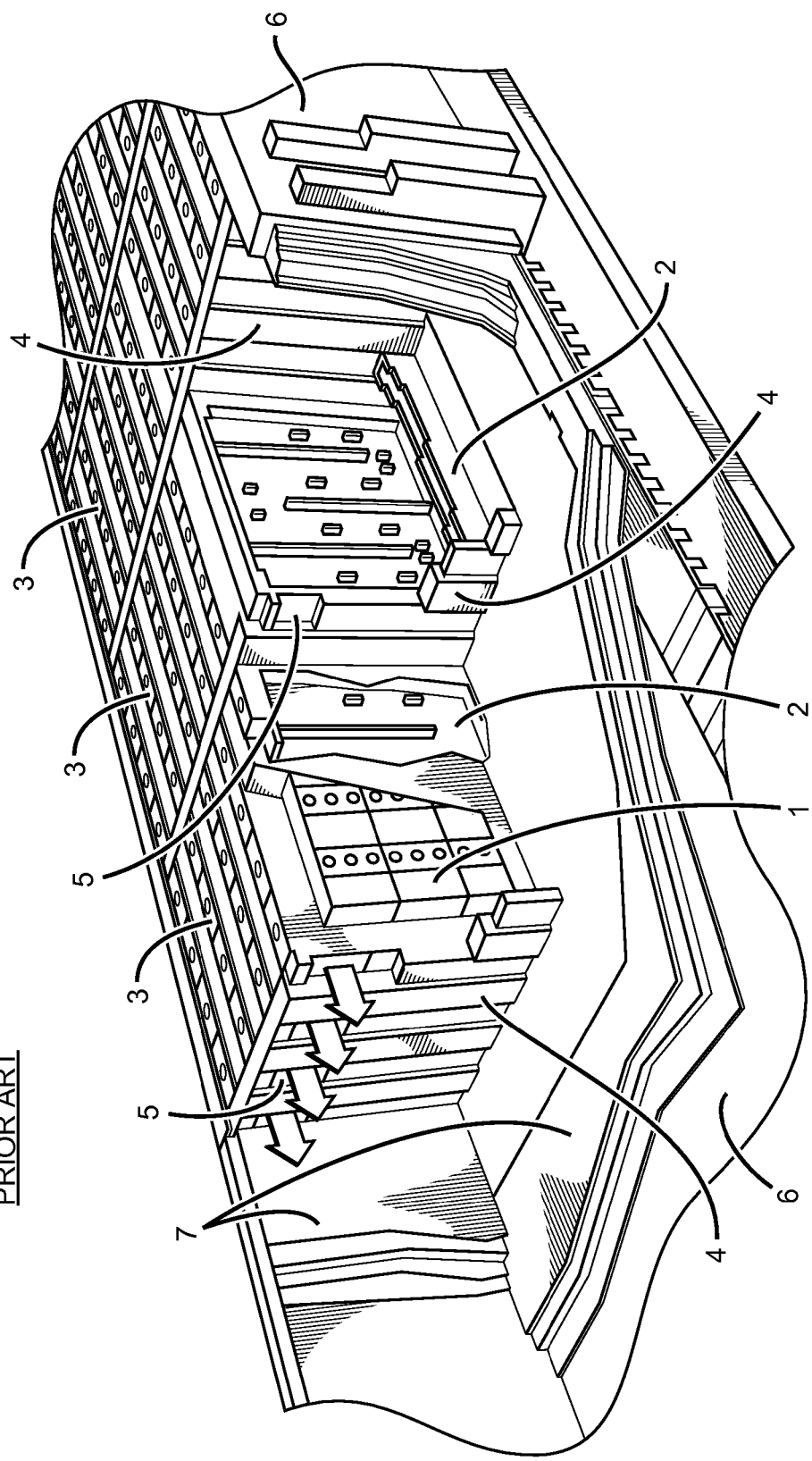
FIG. 2 is a partial cut-away view of the exemplary ring furnace of FIG. 1.

Prior art FIG. 2 provides a more detailed schematic view of the sections in the furnace. Here, numeral 1 depicts within the pit that is formed by two adjacent wall elements anodes (in light grey) and packing coke (in dark grey). The wall elements 2 include an internal flue channel within which the combustion gases move from one wall element/zone to another via fluid coupling through openings (at 5) in the headwall 4 of the wall elements. Circulation of the hot gases is schematically indicated with the numeral 5. As is readily apparent from this illustration, multiple wall elements 2 form multiple pits of a single section 3 within a zone and help convey heated gases from one section to another and one zone to another. The sections and flues are typically contained within a concrete tub 6 that is lined with thermal insulation 7. Movement of the draft frame, the firing unit, and the exhaust and cooling manifold is typically manually performed or in an at least partially automated manner. Fire control is typically performed in either semi automated or fully automated manner using a computer to control the process (not shown).

Figure 3:
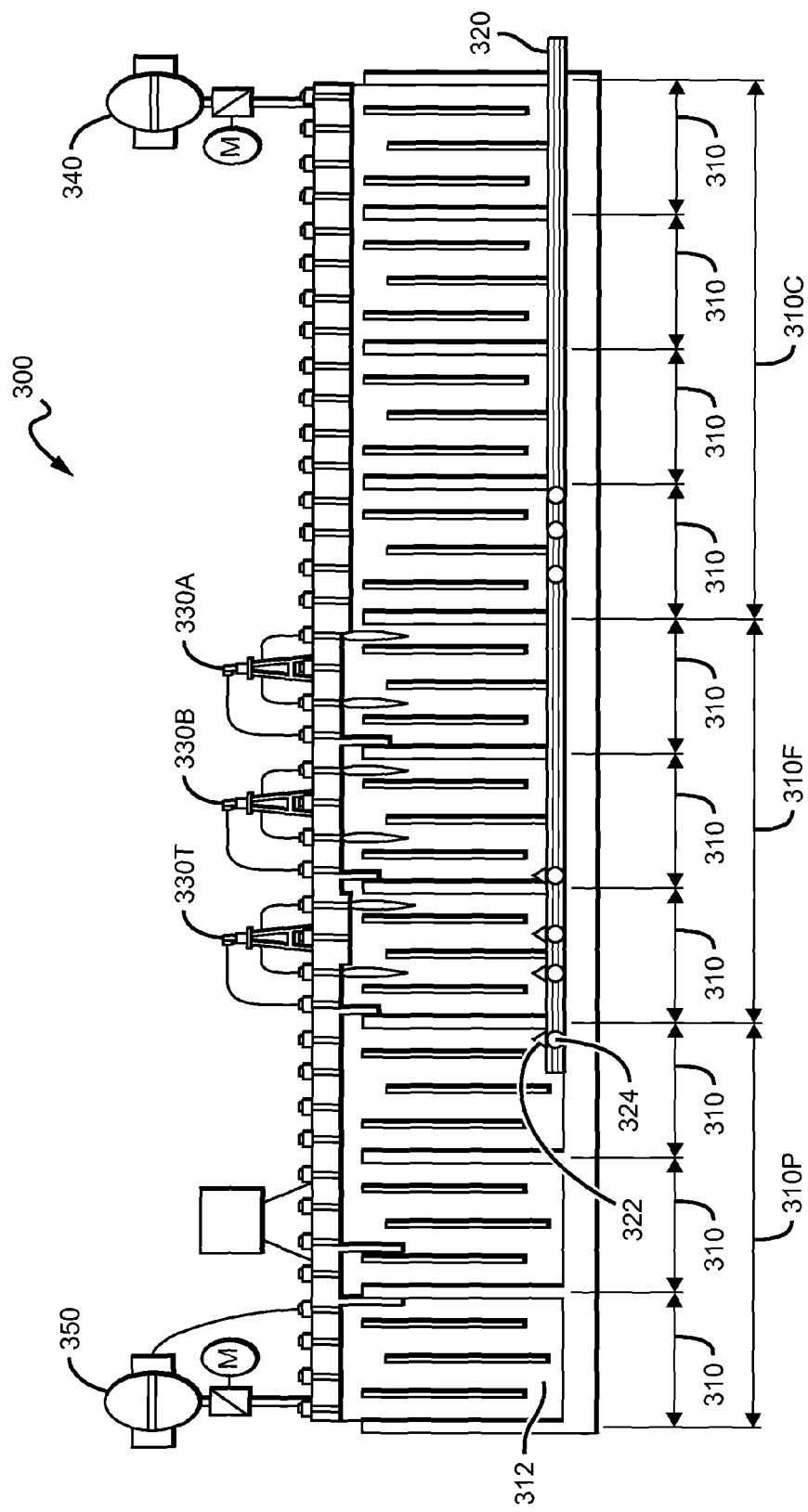
FIG. 3 is a schematic illustration of a ring furnace according to the inventive subject matter.

The inventors have discovered that a supplemental oxygen conduit can be implemented in existing or new carbon baking furnaces in a conceptually simple and effective manner to so reduce fuel demand and increase combustion of pitch and volatiles. FIG. 3 exemplarily shows a schematic of a carbon baking heat recovery ring furnace 300 according to the inventive subject matter. The furnace comprises a number of wall elements 310, each having an internal flue channel 312. The wall elements are then fluidly coupled to each other such that the internal flue channels form a continuous flow path as illustrated in Prior Art FIG. 2. As a consequence, and as a function of placement of the firing frame and cooling/exhaust manifolds, the continuous path forms in sequence, a pre-heat zone 310P, a firing zone 310F having first, second, and terminal firing frames 330A, 330B, and 330T, respectively, and a cooling zone 310C. In the example of FIG. 3, the preheat zone 310P comprises three distinct sections that are fluidly and thermally coupled to each other. The temperature of these sections (from left to right) is typically 200-600° C., 600-850° C., and 850-1050° C., respectively, while the firing zone 310F has three sections with temperatures of about 1050-1200° C. in each zone. Next to the firing zone is a cooling zone 310C that includes four sections with decreasing temperatures of 1050-1200° C., 1075-1150° C., 900-1075° C., and 800-900° C., respectively. Of course, it should be recognized. that the number of sections may vary considerably.

A supplemental oxygen conduit 320 is in direct heat exchange with the hot cooling air flowing through the internal flue channel and has a plurality of gates 324 (not all gates shown) that are fluidly coupled to delivery openings 322 (not all openings shown) to so allow fluidly coupling of a supplemental oxygen source to the flue channel of the firing zone and/or pre-heat zone. Moreover, it should be noted that the supplemental oxygen conduit is thermally coupled to the internal flue channel of the cooling zone such that the supplemental oxygen flowing through the supplemental oxygen conduit is heated by the heated cooling air in the cooling section. Thus, a heated supplemental oxygen stream can be directly delivered to the firing and/or pre-heat zone. Most typically, the delivery openings and gates are placed in the supplemental oxygen conduit such that each of the delivery openings and gates can provide supplemental oxygen from the supplemental oxygen conduit to the internal flue channel in each wall element, respectively. Thus, by opening or closing the appropriate gates, a supplemental oxygen conduit can be configured that delivers heated supplemental oxygen to the flue channel of at least one wall element in the firing zone and/or preheat zone, even where the function of the wall element changes (e.g., from preheat to firing). Most preferably, the supplemental oxygen conduit and/or the gates/delivery openings are configured (or operable) such as to allow delivery of the supplemental oxygen without substantially moving the zero point of a firing train in the ring furnace during operation.

In this context, it should be noted that the cooling manifold 340 is coupled to a blower, booster, or other fan to so deliver ambient air to the internal flue channel, most typically via a cooling manifold. Thus, the pressure at the delivery point of the ambient air to the internal flue channel is relatively high and decreases as the air flows through the tortuous path within the wall elements of the cooling zone. On the other end, an exhaust manifold 350 is coupled to a draft fan or other device to so produce a negative pressure in the pre-heating zone and firing zone. The zero point is thus the location at which the pressure is at about ambient pressure. It should be noted that movement of the zero point from such position may adversely affect operation. For example, if the zero point moves into the firing zone, serious difficulties may arise due to the positive pressure at the fuel injection site. On the other hand, if the zero point substantially moves into the cooling zone, preheating and cooling may be adversely affected.

Remarkably, the inventors have discovered that a supplemental oxygen conduit can be implemented that allows delivery of sufficient quantities of a heated supplemental oxygen stream directly to the internal flue channels of the firing and/or preheat zone to thereby reduce fuel gas consumption and increase combustion efficiency without substantially moving the zero point. In this regard, it should be recognized that heating of the supplemental oxygen stream can be done in numerous manners.

For example it is generally preferred that the heating of the supplemental oxygen stream is performed using convective heat transfer from the heated cooling stream in the internal flue channel to the supplemental oxygen stream. In such case, it is contemplated that the supplemental oxygen conduit is formed in or directly disposed in the flue channel of the wall element. Alternatively, to ensure heat transfer, the supplemental oxygen conduit may also be coupled to the flue channel. Thus, it is generally contemplated that the supplemental oxygen conduit is an internal conduit (e.g., formed as an integral part of a wall element, added to the wall element, or at least partially disposed within the flue channel of the wall elements). Alternatively, the supplemental oxygen conduit may also be at least in part external to the wall element. In such case, it is generally preferred that the conduit is located in, at, or near the sides or even bottom of the wall elements, and that the conduit will be covered by insulating material normally covering the wall elements.

In further contemplated aspects, heating of the supplemental oxygen stream may also be achieved by combination of the supplemental oxygen stream with a portion of the heated cooling stream that is moving in the internal flue channel of a cooling section. In such case, it is also preferred (but not required) that the supplemental oxygen conduit is in thermal heat exchange relation to the flue channel of the flue channel. In even less preferred aspects, the supplemental oxygen conduit may also be external to the wall element (or even furnace) and heating is performed by feeding a portion of the heated cooling air to the supplemental oxygen stream. The portion of the heated cooling air stream for combination with the supplemental oxygen stream will typically be between about 5-15 vol %, more typically between 5-25 vol %, even more typically between 15-35 vol %, and most typically between about 20-40 vol %. In even less preferred aspects, a heat transfer solution (e.g., molten salt solution, oils, etc.) may be used for heating the supplemental oxygen stream.

Regardless of the manner of heating, it is preferred that the supplemental oxygen stream is heated with the waste heat from the cooling section, and that the temperature of the so heated supplemental oxygen stream will preferably be in the range of between 1150-1200° C., 1100-1150° C., 1050-1100° C., 1000-1050° C., 950-1000° C., 900-950° C., and/or 800-900° C. Most typically, the so heated supplemental oxygen stream will then be fed into one or more internal flue channels of one or more wall elements of the preheat and/or firing section. Therefore, it should be recognized that the heated supplemental oxygen stream will serve multiple advantages. First, as the waste heat from the cooling section is recycled to the preheat and/or firing section, less filet is required for generating the temperatures necessary for combustion of the pitch and volatiles. Second, as the heated supplemental oxygen also delivers oxygen to the preheat and/or firing section, complete combustion is supported, and oxygen otherwise required for the fuel combustion is now available for combustion of the pitch and volatiles.

It should further be noted that the nature of the supplemental oxygen stream may vary considerably, and that all process streams with an oxygen content of at least 2-5 vol %, and more typically at least 5-10 vol %, and most typically at least 10-20 vol % are deemed suitable. Thus, especially preferred supplemental oxygen streams include ambient air, combustion exhaust from a combustion source (which may or may not come from the baking operation), smelting off gases, air enriched in oxygen, and even relatively pure (e.g., purity at least 90 mol %) oxygen. Moreover, the supplemental oxygen stream may already be preheated by a waste heat or other heat source outside the furnace, and may be at ambient or higher pressure. Thus, and especially as the firing and/or preheat zones are operated at a negative pressure, the delivery of the supplemental oxygen stream may be entirely driven by the pressure gradient in the furnace. However, delivery may also be effected by a pressure control device (e.g., blower, pressurized source of supplemental oxygen stream, etc.). In this context, it should also be appreciated that use of contemplated supplemental oxygen conduits will allow for a reduction of the negative pressure in the preheat section, which will reduce the energy requirement for the draft fans. Due to the reduced draft and complete combustion, it should also be appreciated that downstream equipment (e.g., filters, scrubbers, solvent pumps, etc) may be reduced and that maintenance and downtime is reduced.

With respect to the delivery of the supplemental oxygen stream it is typically preferred that the heated supplemental oxygen stream is fed to at least one wall element of at least one zone, and most preferably at least one of the preheat and firing zone. For example, it is contemplated that the gate and/or delivery opening is configured to deliver the supplemental oxygen stream to a position downstream of a first firing frame in the firing zone, and/or to a position at or downstream of a terminal firing frame in the firing zone. Most typically, the gate and/or delivery opening are configured such as to directly deliver the heated supplemental oxygen stream into the flue channel of a wall element. However, in alternative aspects, the gate and/or delivery opening may be configured such as to deliver the heated supplemental oxygen stream into an intermediary conduit or distribution element that then delivers the heated supplemental oxygen stream into the flue channel of one or more wall elements. While gates are typically considered the regulatory device to control flow of the heated supplemental oxygen stream, it should be noted that the delivery opening could also perform a regulatory function. For example, the delivery opening could be used to direct the supplemental oxygen stream in a particular direction or flow pattern, or could be used to provide a venturi or other type of dynamic flow control device. Thus, delivery openings could be separately controllable, or not controlled at all and merely present an opening downstream or part) of the gate.

Therefore, it should be appreciated that multiple gates and delivery openings to multiple elements/zones are contemplated, and that the operational demands will dictate the choice and number of gates and delivery. openings that are open for delivery. Moreover, it should be noted that the control over the gates/delivery openings on the supplemental oxygen conduit may not only be used for temperature control, but also for combustion control, and control of a desired temperature gradient. Additionally, the gates, delivery openings, and supplemental oxygen conduit may also be used to maintain or change a pressure gradient in the ring furnace, and even to control the location of the zero point where significant quantities of a supplemental oxygen stream are being used. Most typically, control of the gates is performed in an automated or semi-automated fashion using a control circuit for opening and/or closing the gates.

It should still further be appreciated that the gates can be operated such that multiple individual and fluidly separate supplemental oxygen conduits can be configured and operated within the same furnace. For example, auxiliary supplemental oxygen conduits may be generated by actuating the gates such that a desired heat distribution and/or temperature gradient can be achieved within a single zone (e.g., within the firing zone and/or preheat zone). Moreover and where desired, one or more pressure control devices may be coupled to the supplemental oxygen conduit and/or gates to so allow moving a supplemental oxygen stream in a desired direction and/or at a desired rate. For example, the direction may be opposite to the direction of the flue gas moving through the internal channel and the rate may be higher or lower than the flow rate of the flue gas moving through the internal channel.

Therefore, the inventors also contemplate a method of reducing energy consumption of a furnace in which a plurality of gates are operated to configure a supplemental oxygen conduit such that at least a portion of the supplemental oxygen conduit is thermally coupled to at least a portion of the internal flue channel of the cooling zone. A supplemental oxygen stream is then heated in the supplemental oxygen conduit using heat from a cooling air stream flowing through the internal flue channel of the cooling zone, and at least a portion of the thusly heated supplemental oxygen stream is directly delivered to the internal flue channel of the firing zone and/or the pre-heat zone. Viewed from yet another perspective, it is contemplated that a method of reducing energy consumption of a ring furnace comprises a step of recycling heat energy from the cooling zone to the pre-heat zone and/or firing zone, wherein the heat energy is carried from the cooling zone to the pre-heat and/or firing zone by a supplemental oxygen stream. With respect to the furnace, the gates/delivery openings, the supplemental oxygen conduit, and other components used in these methods, the same considerations as provided above apply and are not reiterated here.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An oxygen preheat and heat recovery system for use in a carbon baking furnace, comprising:
   a plurality of wall elements, each having an internal flue channel, wherein the plurality of wall elements are fluidly coupled to each other such that the internal flue channels form a continuous flow path having, in sequence, a pre-heat zone, a firing zone, and a cooling zone;
   a supplemental oxygen conduit thermally coupled to at least a portion of the flue channel of the cooling zone such that a supplemental oxygen stream flowing in the supplemental oxygen conduit is isolated from and heated by a cooling air stream flowing through the cooling zone;
   a plurality of gates coupled to the supplemental oxygen conduit and configured to direct flow of the supplemental oxygen stream into a desired wall element of the at least one of the firing zone and the pre-heat zone; and
   wherein the supplemental oxygen conduit further comprises a delivery opening that is configured to deliver the supplemental oxygen stream directly to the internal flue channel of at least one of the firing zone and the pre-heat zone.

2. The oxygen preheat and heat recovery system of claim 1 wherein the supplemental oxygen conduit is formed within a wall section of the plurality of wall elements.

3. The oxygen preheat and heat recovery system of claim 1 wherein the supplemental oxygen conduit is at least partially disposed within the flue channels of the cooling zone.

4. The oxygen preheat and heat recovery system of claim 1 further comprising a control system that is configured to automatically operate the plurality of gates such that the flow to desired wall element of the at least one of the firing zone and the pre-heat zone is maintained as a firing frame is moved in firing direction.

5. The oxygen preheat and heat recovery system of claim 1 wherein the delivery opening is configured to deliver the supplemental oxygen stream to a position downstream of a first firing frame in the firing zone.

6. The oxygen preheat and heat recovery system of claim 1 wherein the delivery opening is configured to deliver the supplemental oxygen stream to a position at or downstream of a terminal firing frame in the firing zone.

7. The oxygen preheat and heat recovery system of claim 1 wherein the delivery opening is configured to deliver the supplemental oxygen stream to the internal flue channel of the pre-heat zone.

8. The oxygen preheat and heat recovery system of claim 1 wherein the supplemental oxygen conduit is configured to allow delivery of the supplemental oxygen stream at about an operating pressure present in the at least one of the firing zone and the pre-heat zone.

9. A method of reducing energy consumption of a furnace having a plurality of wall elements, each having an internal flue channel, wherein the plurality of wall elements are fluidly coupled to each other such that the internal flue channels form a continuous flow path to form, in sequence, a pre-heat zone, a firing zone, and a cooling zone, comprising:
   operating a plurality of gates to configure a supplemental oxygen conduit such that at least a portion of the supplemental oxygen conduit is thermally coupled to at least a portion of the internal flue channel of the cooling zone;
   heating a supplemental oxygen stream in the supplemental oxygen conduit using heat from a cooling air stream flowing through the internal flue channel of the cooling zone; and
   delivering at least a portion of the heated supplemental oxygen stream directly to the internal flue channel of at least one of the firing zone and the pre-heat zone, wherein the plurality of gates are coupled to the plurality of wall elements, and wherein the supplemental oxygen conduit is formed within a wall section of the plurality of wall elements.

10. The method of claim 9 wherein the supplemental oxygen stream is heated to a temperature that is higher than a temperature of the at least one of the firing zone and the pre-heat zone.

11. The method of claim 9 wherein the step of heating the supplemental oxygen stream in the supplemental oxygen conduit is performed using a heat exchange medium.

12. The method of claim 9 wherein the step of heating the supplemental oxygen stream in the supplemental oxygen conduit is performed by radiant heat transfer from the cooling air stream flowing through the internal flue channel to the supplemental oxygen stream.

13. The method of claim 9 wherein the supplemental oxygen stream is delivered to a position at or downstream of a terminal firing frame in the firing zone.

14. The method of claim 9 wherein the portion of the heated supplemental oxygen stream is delivered at about an operating pressure present in the at least one of the firing zone and the pre-heat zone.

15. A method of reducing energy consumption of a ring furnace having a pre-heat zone, a firing zone, and a cooling zone, comprising:
   recycling heat energy from the cooling zone to at least one of the pre-heat zone and the firing zone, wherein the heat energy is carried from the cooling zone to the at least one of the pre-heat zone and the firing zone by a supplemental oxygen stream;
   wherein flow of the supplemental oxygen stream is directed into a desired wall element of the at least one of the firing zone and the pre-heat zone via a plurality of gates coupled to a conduit carrying the supplemental oxygen stream.

16. The method of claim 15 wherein the step of recycling is performed using a configurable conduit that is formed in or runs though a plurality of wall elements that make up the pre-heat zone, the firing zone, and the cooling zone.

17. The method of claim 15 wherein the supplemental oxygen stream is delivered at about an operating pressure present in the at least one of the firing zone and the pre-heat zone.

18. The method of claim 15 wherein the supplemental oxygen stream has an oxygen concentration that is greater than 21%.

* * * * *